United States Patent [19]

Mutton

[11] 4,238,909
[45] Dec. 16, 1980

[54] METAL DOOR FRAME ASSEMBLY

[75] Inventor: John Mutton, Northfield, Australia

[73] Assignee: Rollform Pty. Ltd., Northfield, Australia

[21] Appl. No.: 18,664

[22] Filed: Mar. 8, 1979

[30] Foreign Application Priority Data

Mar. 10, 1978 [AU] Australia ............................. PD3682

[51] Int. Cl.³ .............................................. E06B 1/04
[52] U.S. Cl. ...................................... 49/504; 52/211;
        52/657; 403/402
[58] Field of Search .......................... 49/504; 160/381;
        403/402, 401, 403, 205; 52/656, 657, 211, 213

[56] References Cited

U.S. PATENT DOCUMENTS

| | | | |
|---|---|---|---|
| 3,429,076 | 2/1969 | Fortsch et al. | 49/504 |
| 3,585,770 | 6/1971 | Mailler | 49/504 |
| 3,835,616 | 9/1974 | Van Wieringen | 403/402 |
| 4,015,382 | 4/1977 | Noyes | 49/504 X |

Primary Examiner—Philip C. Kannan
Attorney, Agent, or Firm—Wofford, Fails & Zobal

[57] ABSTRACT

A metal door frame assembly comprising two jambs and a lintel, all of the same crosssectional shape, which includes a central door striker portion flanked on its two sides by an inner web and an outer web respectively, each web terminating in a respective end flange which itself terminates in a inturn flange, each inturn flange terminating in an returned flange. Assembly of the jambs and lintel is effected by mitre joints, and at each mitre joint there is a bridging strip which extends between the facing surfaces of the end flanges, and which bears against the rear surfaces of the inner and outer webs of the jamb and lintel. The bridging strip is retained in position by a pair of locking plates, each of which has a pair of tabs which engage respective apertures in the returned flanges of the jamb and lintel.

7 Claims, 6 Drawing Figures

METAL DOOR FRAME ASSEMBLY

This invention relates to an assembly of the lintel and jamb portions of a metal door frame.

BACKGROUND OF THE INVENTION

It is a usual practice in the art to utilise metal door frames of channel like cross-sectional configuration, there being a central door striker portion flanked on its two sides by an inner web and an outer web respectively, each web terminating in a respective end flange which itself terminates in a inturn flange, each inturn flange terminating in an return flange. This invention relates to an assembly of jambs and lintel of a door frame, which also have the above defined cross-sectional shape. The space between the two return flanges is slightly greater than a brick width so that a brick can be interposed between the flanges, and it is usual for the door frame to be tied to brickwork by means of wire or sheet metal ties. Alternatively, a timber frame vertical member or nogging can be positioned between the flanges in the case of a timber frame wall. The inturn flange length is slightly greater than the thickness of plaster, so that the application of plaster or plaster board results in a neat appearance at the junction of the end and return flanges on both sides of the wall.

The joining together of the jamb portions and the lintel portion has always constituted a problem. Early practice was to weld the members together, but this was time consuming and expensive, resulted in heat distortion, and required that the door frame should be transported to site as an assembly. Consequently, efforts have been made to produce a satisfactory interconnection which enables the door frame to be transported to site in a knock-down condition and to be assembled on site. In one proposal, the lintel portion was provided with slots and the jamb portions with tabs which extended through the slots and were folded over, but this resulted in a very flimsy assembly which has not been widely approved by builders. In another alternative, location plates were welded to the contiguous ends of the jambs and lintel portions of the frame but these resulted in the formation of weld marks on the face of the door frame, and in some instances of heat distortion marks, and these also were not of sufficiently high quality to meet with universal acceptance under all conditions.

An object of this invention is to provide a metal door frame assembly wherein the step of assembly can be effected on site, which does not require welding, and which results in a rigid corner connection between the door jamb and lintel portions.

BRIEF SUMMARY OF THE INVENTION

In this invention a metal door frame assembly comprises two jambs and a lintel, all of the same cross-sectional shape, which includes a central door striker portion flanked on its two sides by an inner web and an outer web respectively, each web terminating in a respective end flange which itself terminates in an inturn flange, each inturn flange terminating in a returned flange. Assembly of the jambs and lintel is effected by mitre joints, and at each mitre joint there is a bridging strip which extends between the facing surfaces of the end flanges, and which bears against the rear surfaces of the inner and outer webs of the jamb and lintel. The bridging strip is retained in position by a pair of locking plates, each of which has a pair of tabs which engage respective apertures in the return flanges of the jamb and lintel.

This very simple arrangement achieves a number of important results:

Firstly, the locking plates can both be slightly deformed so that they bear inwardly towards the inner end of the mitre joint, both on the bridging strip and on the inner and outer webs. This has the effect of closing the contiguous edges of the jamb and lintel at the inner end of the mitre joint, and accurately locating those edges.

Secondly, the locking plate tabs can be accurately located, and the resilience of the locking plate can be made use of to close the contiguous edges of the jamb and lintel at the outer end of the mitre joint, and accurately locate those edges at that locality also.

Further, each locking plate can be arranged to bear against the rear surfaces of a web of a jamb and lintel, so that the front surfaces are co-planar.

Most importantly, however, a very rigid and accurate mitre joint is achieved quickly and inexpensively.

More specifically, the invention consists of mitre joints in a metal door frame as hereinbefore defined, each said mitre joint comprising a mitre edge on the jamb and a mitre edge on the lintel contiguous therewith, aperture edges defining tab apertures in the return flanges of both the jamb and lintel, a bridging strip extending between the facing surfaces of the end flanges, and having wings which respectively bear against the web inner surfaces of the jamb and lintel adjacent the mitre edges, and a pair of locking plates each having a pair of tabs which engage the aperture edges of respective said tab apertures in the jamb and lintel, each said locking plate also bearing against the bridging strip.

BRIEF DESCRIPTION OF THE DRAWINGS

An embodiment of the invention is described hereunder in some detail with reference to and is illustrated in the accompanying drawings, in which.

Figure 1:
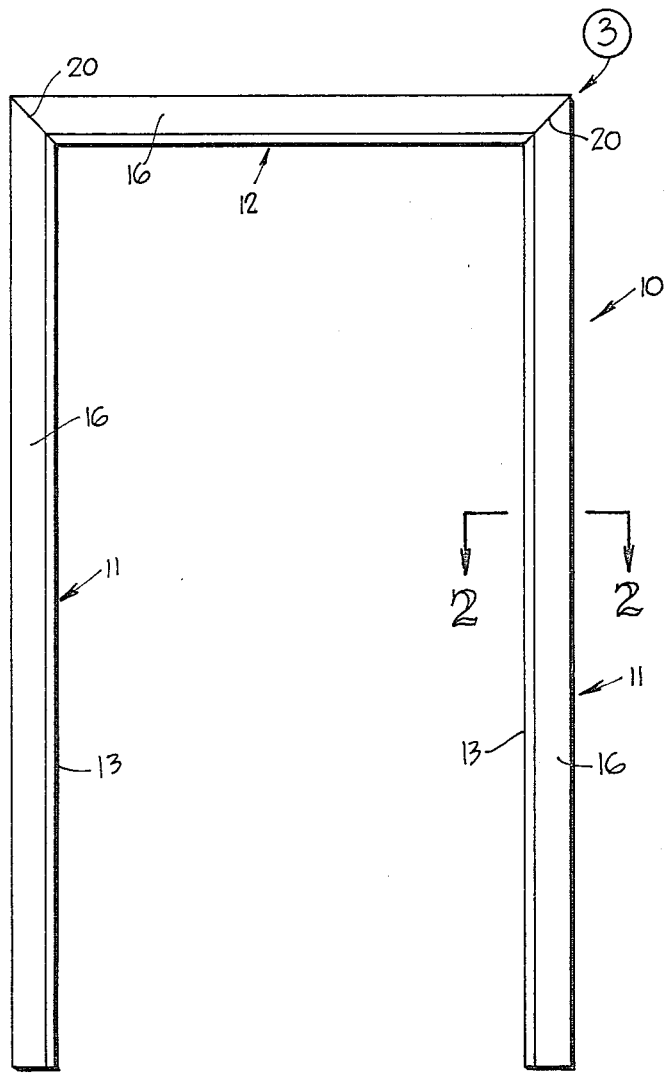
FIG. 1 is a front elevation of a door frame.
Figure 2:
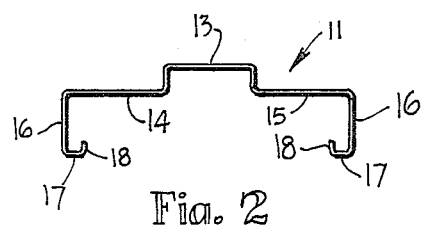
FIG. 2 is a section on line 2—2 of FIG. 1 and drawn to an enlarged scale.
Figure 3:
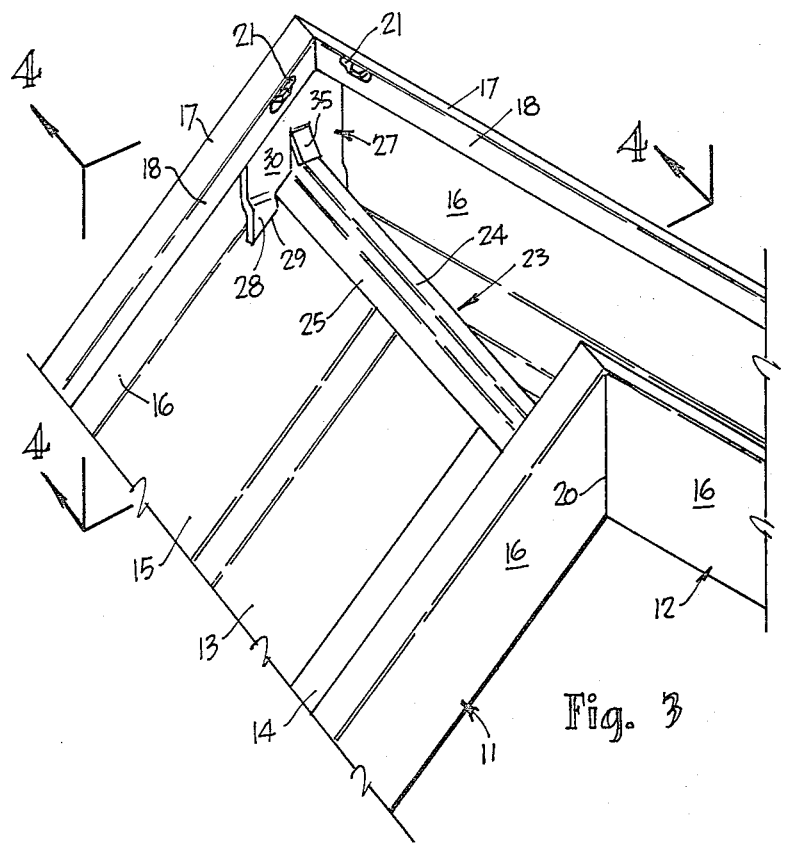
FIG. 3 is a perspective view in the direction of arrow 3 of FIG. 1, drawn to a further enlarged scale.

In this embodiment a metal door frame assembly 10 comprises two jamb portions 11 and a lintel portion 12. All portions have a constant cross-sectional shape which includes a central door striker portion 13 flanked on respective sides by inner and outer webs 14 and 15, and each web is in turn flanked by an end flange 16 which merges into an inturned flange 17, itself merging into a return flange 18. In this regard the cross-sectional shape is in accordance with art which is already known.

Figure 4:
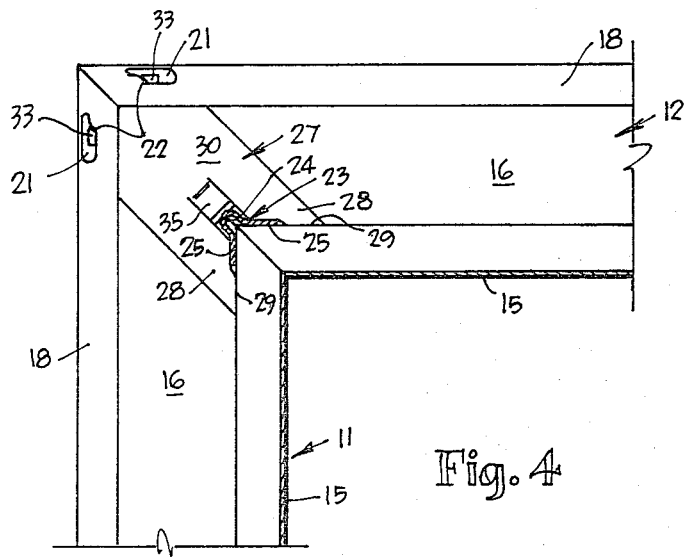
FIG. 4 is a section taken on plane 4—4—4—4 of FIG. 3.
Figure 5:
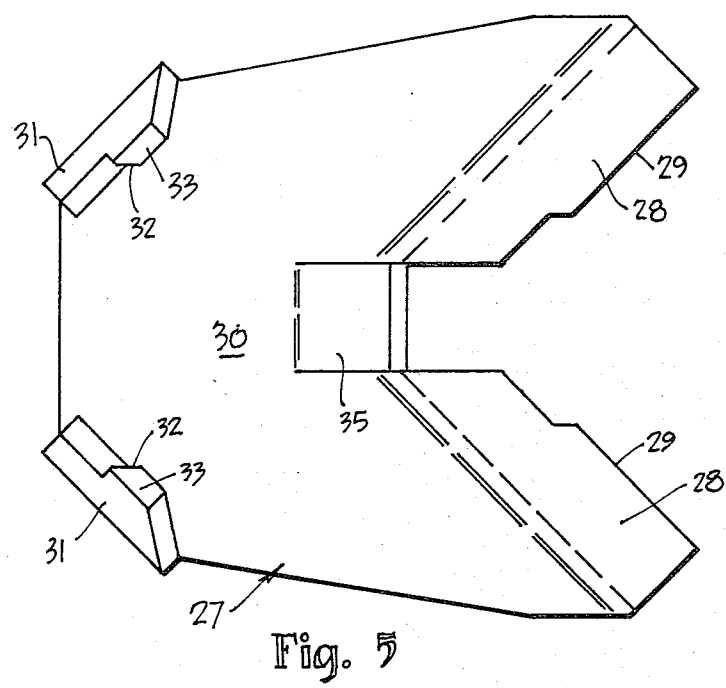
FIG. 5 is a plan view of a locking plate.
Figure 6:
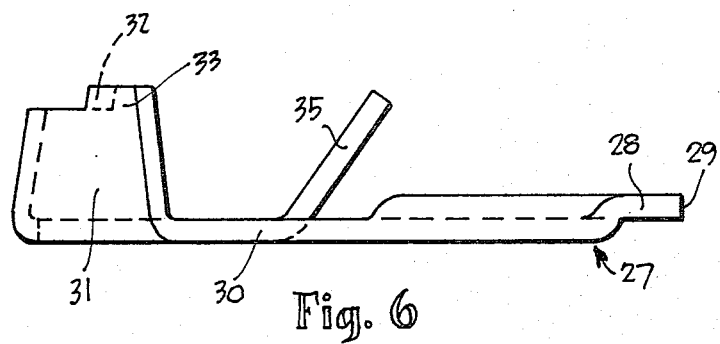
FIG. 6 is a side elevation of FIG. 5.

At the locality of each of the mitre joints 20 between the lintel 12 and jamb 11, the portions are cut to provide accurate 45° mitre edges, great accuracy being desirable at this locality. Two apertures 21 are pierced through respective return flanges 18, each aperture 21 being spaced a short distance only from the mitre edge, and each aperture having an abutment edge 22 which is parallel or nearly parallel to the mitre edge (See FIG. 4). A bridging strip 23 has a cross-sectional shape including a central curved portion 24 and two wings 25 which are planar portions positioned over and abutting the inner web 14 and outer web 15 of each of the jamb and lintel.

Two locking plates 27 are provided at each mitre joint 20, each locking plate 27 being bifurcate at its inner end to provide two locating flanges 28, the end edges 29 of which abut the rear surfaces of the webs 14 or 15 of abutting portions, each plate also having a planar portion 30 intermediate its ends which abuts the rear surface of the inner (or outer) end flange 16 of the jamb and lintel to align the adjacent end flanges in the same plane, and each terminates in a pair of flanges 31 at its outer end, the flanges 31 defining with the planar portion 30 an angle of less than 90° and each of the flanges 31 having a locking shoulder 32 outstanding from an end edge and defining one end of a tab 33, each tab 33 extending into and slightly through a respective aperture 21 in the inturned flange and the locking shoulder 32 bearing against the abutment edge 22 with a force which is proportional to resilient deflection of the locking plate 27. The flange end edge bears against a rear (inner) surface of an inturned flange.

At the bifurcate end of the locking plate, the planar portion 30 is itself lanced to provide a pawl tongue 35 which slopes outwardly at such an angle as to firmly engage the outer surface of the curved portion 24 of the bridging strip 23. A suitable angle for example lies between 30° and 45° between the pawl tongue and the bridging strip. Upon assembling, the resilient deflection of the locking plate causes the tabs 33 to bear firmly against the abutment edges 22 of the respective apertures 21, while at the same time the pawl tongue 35 is forced into firm engagement with the bridging strip 23. The planar portion 30 of the locking plate 27 then firmly abuts the inner or outer webs 14 or 15 of an adjacent jamb and lintel of the door frame, while at the same time forcing the bridging strip into engagement with the inner and outer webs.

The locking of the locking plates with respect to the bridging strip can be varied in a number of ways not illustrated herein. For example the bridging strip may be provided with a notch to receive the end of the pawl tongue, or alternatively the bridging strip planar portions may themselves be slightly less in length than the curved portion so that as the locking plates are deflected into their final position, they locate in the notches formed between the ends of the curved portion and the ends of the planar portions of the bridging strip.

A consideration of the above embodiment will indicate that the invention is extremely simple, utilising only three portions to effect a rigid mitre joint between a jamb and a lintel portion of the door frame. It will be appreciated that the web portions are retained co-planar by the planar portions of the locking plates, and that the bridging strip retains the inner webs in their correct relative location with some resilience such as will correct any minor dimensional tolerance which may exist in the mitre edges of the abutting frame members. It will also be seen that the flanges of the locking plate together with their tabs are deflected resiliently so as to continuously apply force to join together the mitre edges of the adjacent frame portions.

I claim:

1. In a metal door frame comprising two jambs and a lintel, all of the same cross-sectional shape, which said shape includes a central striker portion flanked on its two sides by an inner web and an outer web respectively, each web having a respective end flange which itself terminates in an inturned flange, each inturned flange terminating in a return flange, and mitre joints between the jambs and lintel, each mitre joint comprising:

a mitre edge on the jamb and a mitre edge on the lintel contiguous therewith, aperture edges defining tab apertures in the return flanges of both the jamb and lintel, a bridging strip extending between the facing surfaces of the end flanges, and having wings which respectively bear against the web inner surfaces of the jamb and lintel adjacent the mitre edges, and a pair of locking plates each having a pair of tabs which engage the aperture edges of respective said tab apertures in the jamb and lintel, each said locking plate also bearing against the bridging strip.

2. A mitre joint according to claim 1 wherein said bridging strip has a cross-sectional shape which includes a central curved portion flanked on each side by a said wing.

3. A mitre joint according to claim 1 wherein each said locking plate comprises a pawl tongue which firmly engages the bridging strip between the wings thereof.

4. A mitre joint according to claim 1 wherein each said locking plate comprises a bifurcate end forming a pair of locking flanges, the end edge of each of which bears against both a said wing and the inner surface of a said web.

5. A mitre joint according to claim 1 wherein each said locking plate has a pair of flanges at one end thereof, each having an end edge which bears against the rear surface of a said return flange, and a shoulder which defines an end of a said tab.

6. A mitre joint according to claim 5 wherein each said shoulder is substantially parallel to a said mitre edge and a said aperture edge which is also substantially parallel to that said mitre edge, is an abutment edge abutted by that said shoulder.

7. A mitre joint according to claim 5 wherein each said locking plate is so resiliently deformed that it bears inwardly towards the inner end of the mitre joint with a force, and bears outwardly against the rear surface with a force, such that said forces retain the mitre edges contiguous, and at the same time retain said webs co-planar.

* * * * *